United States Patent
Yang et al.

(10) Patent No.: US 9,898,096 B2
(45) Date of Patent: Feb. 20, 2018

(54) ELECTRONIC DEVICE AND METHOD OF CONTROLLING DISPLAY OF SCREEN THEREOF

(71) Applicant: Samsung Electronics Co., Ltd., Suwon-si, Gyeonggi-do (KR)

(72) Inventors: Changmo Yang, Anyang-si (KR); Junwon Park, Seoul (KR); Hongsik Park, Seoul (KR); Eunjoo Kim, Seoul (KR); Hyungmin Lee, Seoul (KR); Chulho Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/856,138

(22) Filed: Sep. 16, 2015

(65) Prior Publication Data

US 2016/0077607 A1 Mar. 17, 2016

(30) Foreign Application Priority Data

Sep. 17, 2014 (KR) .......................... 10-2014-0123725

(51) Int. Cl.
| | |
|---|---|
| *G09G 5/00* | (2006.01) |
| *G06F 3/0338* | (2013.01) |
| *G06F 1/16* | (2006.01) |
| *G06F 3/0346* | (2013.01) |
| *G06F 3/01* | (2006.01) |

(52) U.S. Cl.
CPC .......... *G06F 3/0338* (2013.01); *G06F 1/1694* (2013.01); *G06F 3/017* (2013.01); *G06F 3/0346* (2013.01); *G06F 2200/1637* (2013.01); *G06F 2203/04804* (2013.01)

(58) Field of Classification Search
CPC ............................ G06F 3/0338; G06F 1/1694
USPC ........................................ 345/156, 163, 625
See application file for complete search history.

(56) References Cited

U.S. PATENT DOCUMENTS

| | | | | |
|---|---|---|---|---|
| 8,659,637 | B2* | 2/2014 | De Beer | H04N 7/142 348/14.08 |
| 2009/0080801 | A1* | 3/2009 | Hatfield | G06T 11/60 382/283 |
| 2012/0116559 | A1* | 5/2012 | Davis | G06F 3/002 700/94 |
| 2012/0268391 | A1* | 10/2012 | Somers | G06F 1/1694 345/173 |
| 2014/0002487 | A1* | 1/2014 | Marison | G09G 5/14 345/629 |
| 2014/0236848 | A1 | 8/2014 | Abhyanker | |

(Continued)

FOREIGN PATENT DOCUMENTS

| | | |
|---|---|---|
| JP | 2012-231268 A | 11/2012 |
| KR | 10-1307014 B1 | 9/2013 |

*Primary Examiner* — Calvin C Ma
(74) *Attorney, Agent, or Firm* — Jefferson IP Law, LLP

(57) ABSTRACT

A method of controlling a display of a screen is provided. The method includes selecting a first image and a second image, selecting a masking pattern including at least one first area and at least one second area, measuring an inclination of the electronic device, and determining a part of the first image displayed in a screen corresponding to the at least one first area and a part of the second image displayed in a screen corresponding to the at least one second area, based on the measured inclination of the electronic device, and outputting the determined parts of the first image and the second image on a display unit.

22 Claims, 13 Drawing Sheets

(56) References Cited

U.S. PATENT DOCUMENTS

2015/0179147 A1* 6/2015 Rezaiifar ............ G03B 21/142
345/625
2015/0213784 A1* 7/2015 Jafarzadeh ............... G09G 5/00
345/163

* cited by examiner

ELECTRONIC DEVICE AND METHOD OF CONTROLLING DISPLAY OF SCREEN THEREOF

CROSS-REFERENCE TO RELATED APPLICATION(S)

This application claims the benefit under 35 U.S.C. § 119(a) of a Korean patent application filed on Sep. 17, 2014 in the Korean Intellectual Property Office and assigned Serial number 10-2014-0123725, the entire disclosure of which is hereby incorporated by reference.

TECHNICAL FIELD

The present disclosure relates to a technology of controlling a display of a screen according to an inclination of an electronic device.

BACKGROUND

In recent years, various electronic devices for convenience for users have been used. With the recent development of digital technologies, various portable electronic devices, such as mobile communication terminals, personal digital assistants (PDAs), electronic notes, smartphones, tablet personal computers (PCs), and smart watches, which can process communication and personal information processing while the users carry them, have been distributed.

The portable electronic device may include a display, such as a touch screen, in which an input function and an output function are combined such that the user can easily carry it. The portable electronic device may include displays of various sizes according to a function or purpose thereof.

The above information is presented as background information only to assist with an understanding of the present disclosure. No determination has been made, and no assertion is made, as to whether any of the above might be applicable as prior art with regard to the present disclosure.

SUMMARY

In general, one image or function may be provided through one display. The electronic device should receive a separate input from the user to change the currently displayed image or function or alternatively or simultaneously provide another image or function.

Aspects of the present disclosure are to address at least the above-mentioned problems and/or disadvantages and to provide at least the advantages described below. Accordingly, an aspect of the present disclosure is to provide a method of providing various images or functions on a display through an intuitional manipulation.

In accordance with an aspect of the present disclosure, a method of controlling a display of a screen of an electronic device is provided. The method includes selecting a first image and a second image, selecting a masking pattern including at least one first area and at least one second area, measuring an inclination of the electronic device, and determining a part of the first image displayed in a screen corresponding to the at least one first area and a part of the second image displayed in a screen corresponding to the at least one second area, based on the measured inclination of the electronic device, and outputting the determined parts of the first image and the second image on a display unit.

In accordance with another aspect of the present disclosure, an electronic device is provided. The electronic device includes a display unit configured to display a screen, a sensor unit configured to measure an inclination of the electronic device, and a controller configured to select a first image and a second image, select a masking pattern including at least one first area and at least one second area, determine a part of the first image displayed in a screen corresponding to the at least one first area and a part of the second image displayed in a screen corresponding to the at least one second area, based on the measured inclination of the electronic device, and output the determined parts of the first image and the second image on a display unit.

A method of controlling a display of a screen of an electronic device according to an embodiment of the present disclosure allows a user to adjust an inclination of an electronic device to be provided with various images or functions through one display.

An electronic device according to an embodiment of the present disclosure can provide a user with various emotional and visual effects in relation to an image or function according to an inclination of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
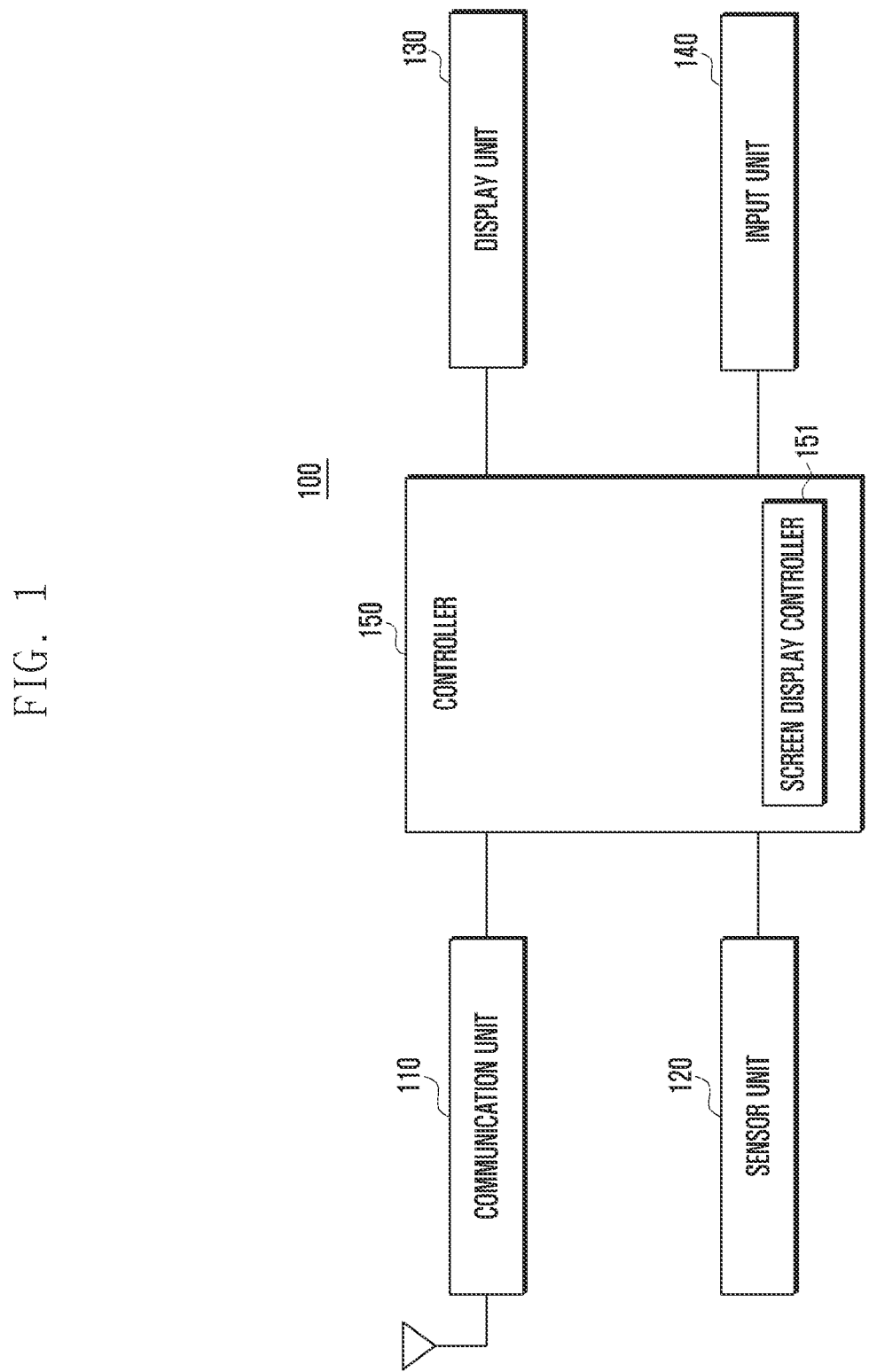
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment of the present disclosure, the expression "include" or "may include" refers to existence of a corresponding function, operation, or element, and does not limit one or more additional functions, operations, or elements. The terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In an embodiment of the present disclosure, the expression "or" includes any or all combinations of words enumerated together. For example, the expression "A or B" may include A, may include B, or may include both A and B.

In an embodiment of the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present disclosure may be an electronic device including a display. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (for example, a head-mounted device (HMD) such as electronic glasses, electronic clothes, an electronic bracelet, an electronic necklace, an electronic appcessory, an electronic tattoo, and a smart watch.

According to various embodiments of the present disclosure, the electronic device may be a smart home appliance. The smart home appliances may include at least one of, for example, televisions (TVs), digital versatile disc (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to various embodiments of the present disclosure, the electronic device may include at least one of various types of medical devices (for example, magnetic resonance angiography (MRA), magnetic resonance imaging (MRI), computed tomography (CT), a scanning machine, ultrasonic wave device and the like), a navigation device, a global positioning system (GPS) receiver, an event data recorder (EDR), a flight data recorder (FDR), a car infotainment device, ship electronic equipment (for example, navigation equipment for a ship, a gyro compass and the like), avionics, a security device, and an industrial or home robot.

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, it is obvious to those skilled in the art that the electronic device according to the present disclosure is not limited to the aforementioned devices.

FIG. 1 is a block diagram of an electronic device 100 according to an embodiment of the present disclosure.

Referring to FIG. 1, the electronic device 100 may include a communication unit 110, a sensor unit 120, a display unit 130, an input unit 140, and a controller 150.

The communication unit 110 may set communication between an electronic device 100 and another electronic device or a server (not illustrated). For example, the communication unit 110 may be linked to a network through wireless or wired communication to communicate with the external device or the server. The wireless communication may include at least one of, for example, Wi-Fi, Bluetooth (BT), near field communication (NFC), a GPS, and cellular communication (for example, long term evolution (LTE), LTE-Advanced (LTE-A), code division multiple access (CDMA), wideband CDMA (WCDMA), universal mobile telecommunication system (UMTS), wireless broadband (WiBro), or global system for mobile communication (GSM)). The wired communication may include at least one of, for example, a universal serial bus (USB), a high definition multimedia interface (HDMI), recommended standard 232 (RS-232), and a plain old telephone service (POTS).

The sensor unit 120 may measure a physical quantity or detect an operational state of the electronic device 100, and may convert the measured or detected information into an electric signal. The sensor unit 120 according to an embodiment of the present disclosure may measure an inclination of the electronic device 100. The sensor unit 120 may include at least one of, for example, an inclination sensor, an acceleration sensor, and a gyro sensor, and may measure an inclination of the electronic device 100 using at least one of an inclination sensor, an acceleration sensor, and a gyro sensor. The sensor unit 120 may measure an inclination of the electronic device 100 that changes in real time. The sensor unit 120 may measure an inclination of the electronic device 100 with respect to at least one of a first axis and a second axis perpendicular to the first axis, for example, with reference to a state in which the display unit 130 of the electronic device 100 is positioned perpendicularly to the ground surface.

The display unit 130 may include a display panel that may output various images to the user. An image according to an embodiment of the present disclosure may include a configuration forming one style which is provided to be output by the controller 150 through the display unit 130. For example, the image may include information, contents and the like provided by the electronic device 100, and may include a user interface (UI) including various functions for interactions between the electronic device 100 and the user. According to various embodiments of the present disclosure, the display panel may be a liquid crystal display (LCD), an active matrix organic light emitting diode (AM-OLED), or the like. The display panel may be implemented to be flexible, transparent, or wearable. According to various embodiments of the present disclosure, the display unit 130 may include a plurality of display panels.

According to various embodiments of the present disclosure, the display panel may display a part of a first image corresponding to a corresponding location thereof in a screen corresponding to at least one first area and may display a part of a second image corresponding to a corresponding location thereof in a screen corresponding to at least one second area, with reference to a masking pattern including the at least one first area and the at least one second area, to output them in one screen, under the control of the controller 150. According to an embodiment of the present disclosure, the first image and the second image may be arranged vertically as different virtual layers under the control of the controller 150. If the transparency of the part of the first image corresponding to the location of the second image is adjusted, the part of the image located in a low level layer may be displayed in a screen corresponding to the second area. For example, the transparency of the part of the first image corresponding to the location of the at least one second area is set to a highest value, and the part of the second image corresponding to the corresponding location may be displayed in a screen corresponding to the second area through the display panel.

According to various embodiments of the present disclosure, the display panel may display a part of the first image corresponding to a corresponding location thereof in a screen corresponding to the first area and may display a part of the second image corresponding to a corresponding location thereof in a screen corresponding to the second area, and may display an overlapped image of the part of the first image and the part of the second image, which corresponds to a corresponding location thereof, in a screen corresponding to at least one third area, with reference to a masking pattern further including the at least one third pattern, in order to output them in one screen, under the control of the controller 150.

As an example, screens corresponding to the third areas may be displayed by variously adjusting the transparencies of the parts of the first images corresponding to locations of the third areas. For example, the transparency of a part of the first image corresponding to one of the third areas may be set to a first value, and the transparency of a part of the first image corresponding to another one of the third areas may be set to a second value. The first value and the second value may be the same or different.

As another example, screens corresponding to the third areas may be displayed by adjusting the transparencies of parts of the first image corresponding to the locations of the second areas in the form of gradation within a range between a maximum value and a minimum value. For example, when the transparencies of parts of the first image corresponding to the third areas are adjusted in the form of gradation within a predetermined range, the screens corresponding to one of the third areas may be displayed while being overlapped, according to the transparency of the part of the first image.

The input unit 140 may include various input units that may receive various inputs from the user. For example, the input unit 140 may include a touch panel, a pen sensor, a key, and an ultrasonic input unit. For example, the touch panel may recognize a touch input through at least one type of a capacitive type, a resistive type, an infrared type, an electromagnetic induction type, and an ultrasonic type. A capacitive touch panel may recognize a physical contact or a proximity. The electronic device 100 may include a touch screen in which a touch panel forms one module with a display panel of the display unit 130. The pen sensor may be implemented, for example, using the same or similar method of receiving a user's touch input or using a separate recognition sheet. The key may include a physical button, an optical key, and a keypad. The ultrasonic input device identifies data by detecting a micro acoustic wave with the electronic device 100 through an input tool for generating an ultrasonic signal, and may perform wireless recognition. According to an embodiment of the present disclosure, the electronic device 100 may also receive a user input from an external device (for example, an electronic device or a server) connected thereto using the communication unit 110.

The controller 150 controls an overall operation of the electronic device 100 and signal flows between internal components, performs a function of processing data, and controls supply of electric power from a battery to the components. The controller 150 according to an embodiment of the present disclosure may include a screen display controller 151. The screen display controller 151 may be managed by a screen display control program stored in a storage unit (not illustrated).

The screen display controller 151 may select a first image and a second image. The screen display controller 151 may select a first image and a second image, for example, based on settings or a user input through the input unit 140. According to an embodiment of the present disclosure, the first image may include at least one of information, contents, and a UI that are different from those of the second image. According to an embodiment of the present disclosure, the screen display controller 151 may select an arbitrary image based on settings or a user input through the input unit 140, and may generate a first image and a second image by copying the selected image. For example, the selected image and the copied image may be generated as the first and second images or the second and first images, respectively. Accordingly, the first image and the second image may be the same image.

The screen display controller 151 may select a masking pattern based on settings or a user input through the input unit 140. The masking pattern may include at least one first area and at least one second area. According to an embodiment of the present disclosure, the electronic device 100 may store a plurality of masking patterns corresponding to various patterns in the storage unit (not illustrated).

The screen display controller 151 may display a screen corresponding to the masking pattern using the first image and the second image. The screen display controller 151 may determine a part of the first image, which will be displayed in a screen corresponding to the at least one first area of the masking pattern, based on an inclination of the electronic device 100 measured through the sensor unit 120. The screen display controller 151 may determine a part of the second image, that will be displayed in a screen corresponding to the at least one second area of the masking pattern, based on the inclination of the electronic device 100 measured through the sensor unit 120. The screen display controller 151 may output the determined part of the first image and the determined part of the second image in one screen through the display unit 130. That is, the display unit 130 may display the determined part of the first image in a screen corresponding to the at least one first image of the masking pattern, and may display the determined part of the second image in a screen corresponding to the at least one second area of the masking pattern. Accordingly, the user may control the electronic device 100 such that the part of the first image and the part of the second image may be displayed at the same time through one screen of the display unit 130 by adjusting the inclination of the electronic device 100. According to an embodiment of the present disclosure, when the part of the first image and the part of the second image include different information, contents, or UIs, the electronic device 100 may provide various information, contents or UIs through one screen.

As an embodiment, the screen display controller 151 may arrange the first image and the second image as an upper layer and a low level layer, respectively. The screen display controller 151 may arrange the selected masking at at least a part of the first and second images. For example, the masking pattern may be arranged in the uppermost layer. According to an embodiment of the present disclosure, the size of the masking pattern may be smaller than those of the first image and the second image. Accordingly, a part of the first image and the second image corresponding to a location where the masking pattern is arranged may be displayed in a screen corresponding to the masking pattern. According to various embodiments of the present disclosure, the masking pattern may move to at least one of the upper, lower, left, and right sides on the arranged first and second images.

The screen display controller 151 may move the first image, which is arranged with respect to the masking pattern, at a preset first acceleration, based on the inclination of the electronic device 100 measured through the sensor unit 120. As an example, when the measured inclination of the electronic device 100 is a reference inclination, the first image may not be moved with respect to the masking pattern. However, when the inclination is not a reference inclination but a first inclination, the screen display controller 151 may move the first image by a first time corresponding to the magnitude of the inclination at a first acceleration, in a direction corresponding to the direction of the first inclination with respect to the masking pattern. When the inclination of the electronic device 100 is changed, the screen display controller 151 may detect the inclination changed in real time, and move the first image with respect to the masking pattern in correspondence to the detected inclination.

The screen display controller 151 may move the second image, which is arranged with respect to the masking pattern, at a preset second acceleration, based on an inclination of the electronic device 100 that is measured through the sensor unit 120. As an example, when the measured inclination of the electronic device 100 is a reference inclination, the second image may not be moved with respect to the masking pattern. When the inclination is a first inclination, the screen display controller 151 may move the second image by a first time corresponding to the magnitude of the inclination at a second acceleration in a direction corresponding to the direction of the first inclination with respect to the masking pattern. When the inclination of the electronic device 100 is changed, the screen display controller 151 may detect an inclination changed in real time and move the second image with respect to the masking pattern in correspondence to the detected inclination. According to an embodiment of the present disclosure, when the first and second images are the same image, the movement distances of the first and second images for the masking pattern may be different if the inclination of the electronic device 100 is measured to be a first inclination.

The screen display controller 151 may display a part of the moved first image corresponding to at least one first area of the arranged masking pattern, in a screen corresponding to the at least one first area. The screen display controller 151 may display a part of the moved second image corresponding to at least one second area of the arranged masking pattern, in a screen corresponding to the at least one second area. Accordingly, when the first and second images are the same image, the screen output through the display 151 may express an effect of deviating one image with reference to a border of the first and second images of the masking pattern if the inclination of the electronic device 100 is measured to be a first inclination. According to various embodiments of the present disclosure, because the masking pattern may move on the arranged first and second images at a predetermined cycle, the part of the first image and the part of the second image displayed in a screen corresponding to the arranged location of the masking pattern may be changed at a predetermined cycle even when the measured inclination of the electronic device has the same value.

As an example, the screen display controller 151 may display a part of the second image located in a low level layer in a screen by adjusting the transparency of the first image of the first and second images arranged in the upper and lower layers. The screen display controller 151 may adjust the transparency of a part of the moved first image corresponding to a location of at least one second area of the masking pattern. Accordingly, the screen display controller 151 may output a part of the moved second image located in the low level layer that corresponds to a location of the at least one second area of the masking pattern in a screen.

For example, the screen display controller 151 may set the transparency of a part of the moved first image corresponding to a location of the at least one second area of the masking pattern, as a maximum value to display a part of the moved second image corresponding to the corresponding location in a screen corresponding to the at least one second area.

As another example, the screen display controller 151 may adjust the transparency of a part of the moved image corresponding to a location of the at least one second area of the masking pattern to display an overlapped image of the part of the first image and the part of the second image corresponding to the corresponding location.

According to an embodiment of the present disclosure, the screen display controller 151 may variously adjust the transparency of the parts of the first image corresponding to the locations of the second areas of the masking pattern. For example, the screen display controller 151 may set the transparency of the part of the first image corresponding to one of the second areas to a first value, and may set the transparency of the part of the first image corresponding to another one of the second areas to a second value. The first value and the second value may be the same or different.

According to another example, the screen display controller 151 may display screens corresponding to the second areas, by adjusting the transparencies of parts of the first image corresponding to the locations of the second areas in the form of gradation, within a range between a maximum value and a minimum value. For example, when the transparencies of parts of the first image corresponding to the second areas are adjusted in the form of gradation within a predetermined range, the screen display controller 151 may display an overlapped image of the part of the first image and the part of the second image according to the transparency of the part of the first image in a screen corresponding to the second areas.

According to various embodiments of the present disclosure, the masking pattern may include a third area together with the first and second areas. The screen display controller 151 may display a part of the moved first image corresponding to a location of the first area of the masking pattern. For example, the screen display controller 151 may set the transparency of a part of the moved first image corresponding to a location of the second area of the masking pattern, as a maximum value to display a part of the moved second image corresponding to the corresponding location in a screen corresponding to the second area of the masking pattern. The screen display controller 151 may set the transparency of a part of the moved first image corresponding to a location of the third area of the masking pattern in various methods, to display an overlapped image of parts of the moved first and second images corresponding to the corresponding location in the second area of the masking pattern.

Accordingly, according to an embodiment of the present disclosure, the screen display controller 151 may display a part of the first image, a part of the second image, and an overlapped part of the first and second images in the first to third areas of the masking pattern on one screen.

According to various embodiments of the present disclosure, the screen display controller 151 may adjust a display attribute of at least one of the displayed part of the first image and the displayed part of the second image, based on an inclination of the electronic device 100 measured through the sensor unit 120. For example, a display attribute of an image may include at least one of, a brightness value, a contrast value, and a size value of the image. For example, the screen display controller 151 may adjust a display attribute of at least one of the displayed part of the first image, and the displayed part of the second image, as a first attribute when the inclination of the electronic device 100 measured through the sensor unit 120 is a reference inclination, and may adjust a display attribute of at least one of the displayed part of the first image and the displayed part of the second image as a first attribute when the measured inclination of the electronic device 100 deviates from a reference inclination. As another example, the screen display controller 151 may adjust a display attribute of at least one of the displayed part of the first image and the displayed part of the second image in proportion to the magnitude of the inclination of the electronic device 100 measured through the sensor unit 120.

According to various embodiments of the present disclosure, the screen display controller 151 may further output a classified display of the masking pattern at a predetermined time interval in a screen output through the display unit 130. The classified display of the masking pattern may be output in the entire screen at the same time, and may be output in a wave form that starts at a predetermined location. According to an embodiment of the present disclosure, the screen display controller may arrange a transparent twinkle mask between the layers of the first image and the second image, and may activate the twinkle mask at the same time or in a wave form at a predetermined time interval. For example, because the activated twinkle mask may be displayed in a screen corresponding to the corresponding area if a part of the first image corresponding to the at least one second area and the at least one third area of the masking pattern become transparent, the screen display controller 151 may output a classified display of the masking pattern using the twinkle mask.

According to various embodiments of the present disclosure, the display unit 130 of the electronic device 100 may include a plurality of displays. For example, when the screen of the first display is controlled as described above, based on an inclination of the electronic device 100, the screen display controller 151 may control the screen of the second display such that the screen of the second display corresponds to the screen of the first display. For example, the screen display controller 151 may display the same screen as the displayed screen of the first display through the screen of the second display. As a further example, the screen display controller 151 may control a display of an image through the second display in the same method as the method of controlling the screen of the first display.

Figure 2:
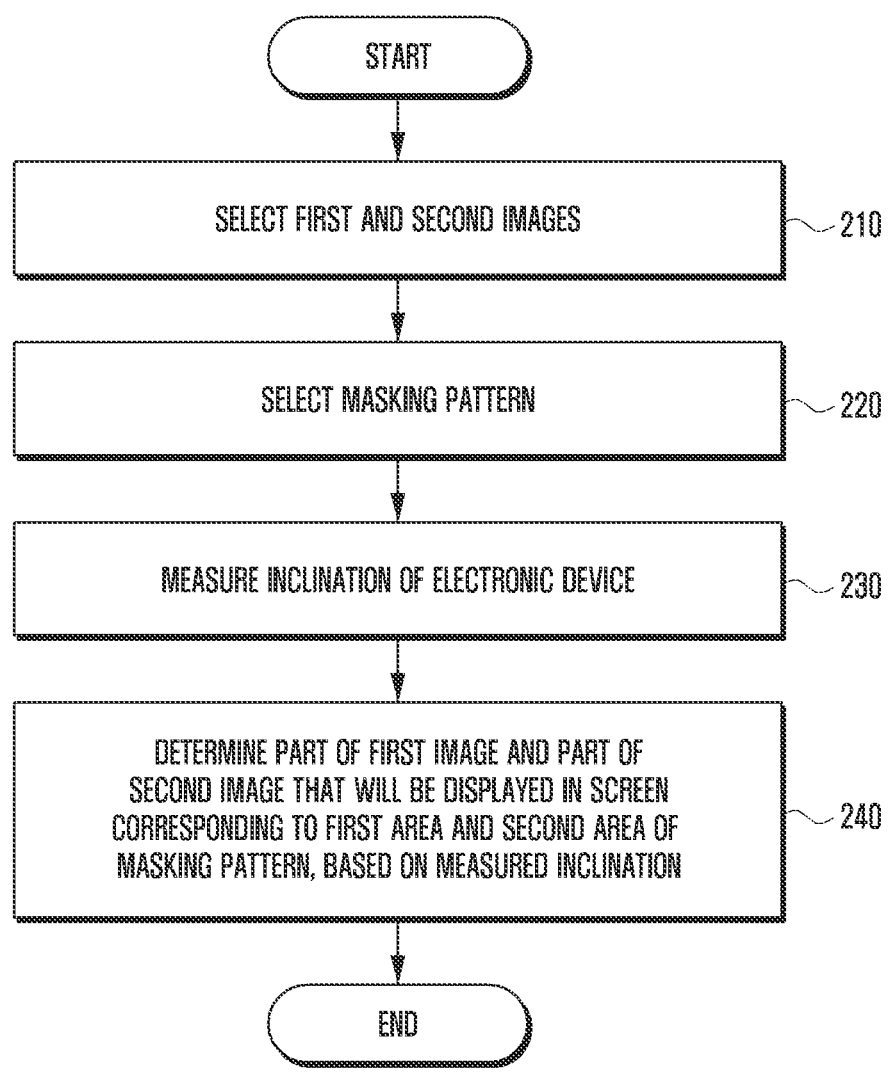
FIG. 2 is a flowchart illustrating a method of controlling a display of a screen of an electronic device according to an embodiment of the present disclosure.

FIG. 2 is a flowchart illustrating a method of controlling a display of a screen of an electronic device 100 according to an embodiment of the present disclosure.

Referring to FIG. 2, the controller 150 may select a first image and a second image in operation 210. The controller 150 may select a first image and a second image according to settings or an input of the user. According to various embodiments of the present disclosure, the first and the second images may be the same image or different images.

The controller 150 may select a masking pattern in operation 220. The controller 150 may select a masking pattern according to settings or an input of the user. The masking pattern may include at least one first area and at least one second area that may be repeated. Meanwhile, according to various embodiments of the present disclosure, the controller 150 may perform operation 210 and operation 220 irrespective of the sequence.

Figure 5A:
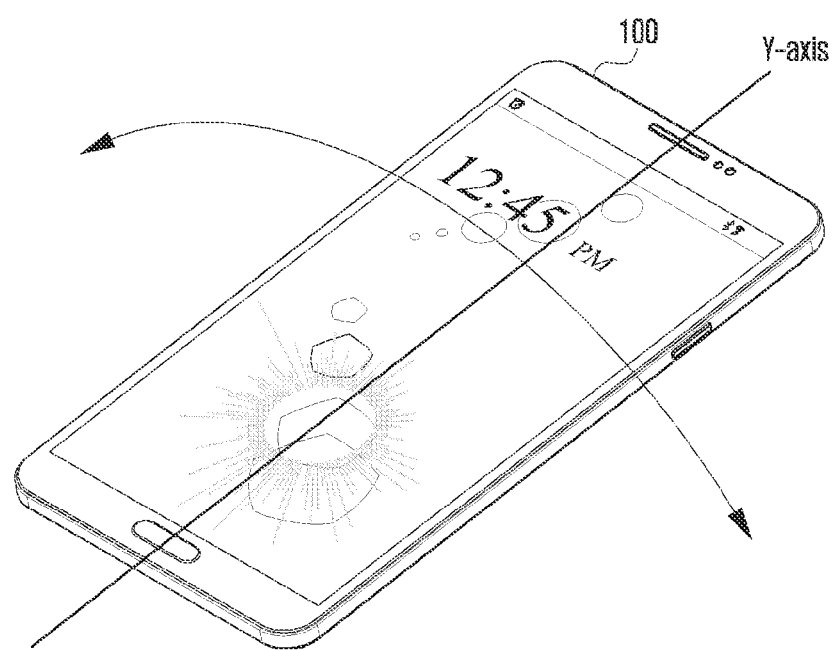
FIGS. 5A and 5B are views illustrating a process of controlling an inclination of an electronic device according to various embodiments of the present disclosure.
Figure 5B:
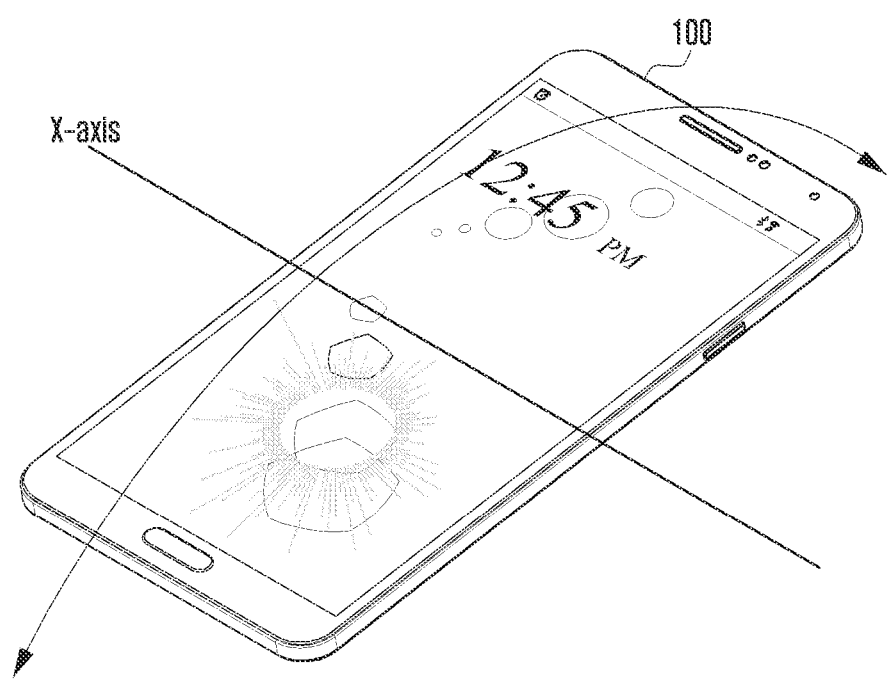

The controller 150 may measure an inclination of the electronic device 100 through the sensor unit 120, in operation 230. For example, as illustrated in FIGS. 5A and 5B (discussed below), the sensor unit 120 may measure an inclination of the electronic device 100 with respect to at least one of a first axis (for example, the X axis) and a second axis (for example, the Y axis) perpendicular to the first axis, with reference to a state in which the display unit 130 of the electronic device 100 is positioned perpendicularly to the ground surface. For example, the controller 150 may measure an inclination that ranges from 0 degrees to 360 degrees, for example, with respect to the first axis through the sensor unit 120, and may measure an inclination that ranges from 0 degrees to 360 degrees with respect to the second axis.

The controller 150 may determine a part of the first image and a part of the second image that will be displayed in screens corresponding to the at least one first area and the at least one second area of the masking pattern, based on the measured inclination of the electronic device 100 to output the determined parts through the display unit 130 in operation 240.

According to an embodiment of the present disclosure, the electronic device 100 may display the part of the first image and the part of the second image at the same time through one screen of the display unit 130 based on the measured inclination of the electronic device 100.

Figure 3:
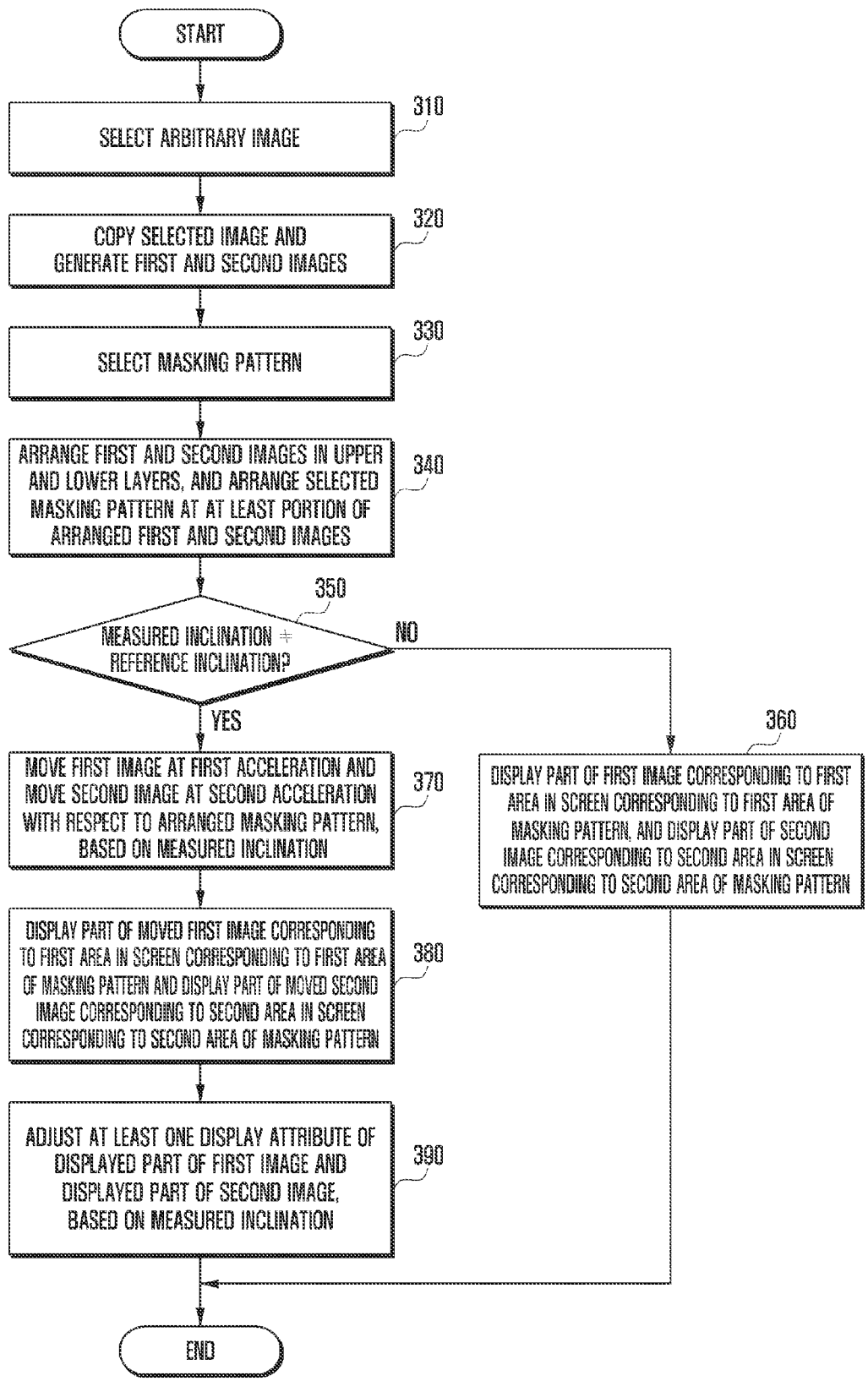
FIG. 3 is a flowchart illustrating a method of controlling a display of a screen of an electronic device according to an embodiment of the present disclosure.

FIG. 3 is a flowchart illustrating a method of controlling a display of a screen of an electronic device 100 according to an embodiment of the present disclosure.

Referring to FIG. 3, the controller 150 may select an arbitrary image in operation 310. The controller 150 may select an arbitrary image according to settings or an input of the user. For example, the controller 150 may select the image 410 illustrated in FIG. 4.

The controller 150 may generate a first image and a second image by copying the selected arbitrary image in operation 320. As an example, the selected image and the copied image may be generated as the first and second images or the second and first images, respectively.

Figure 4:
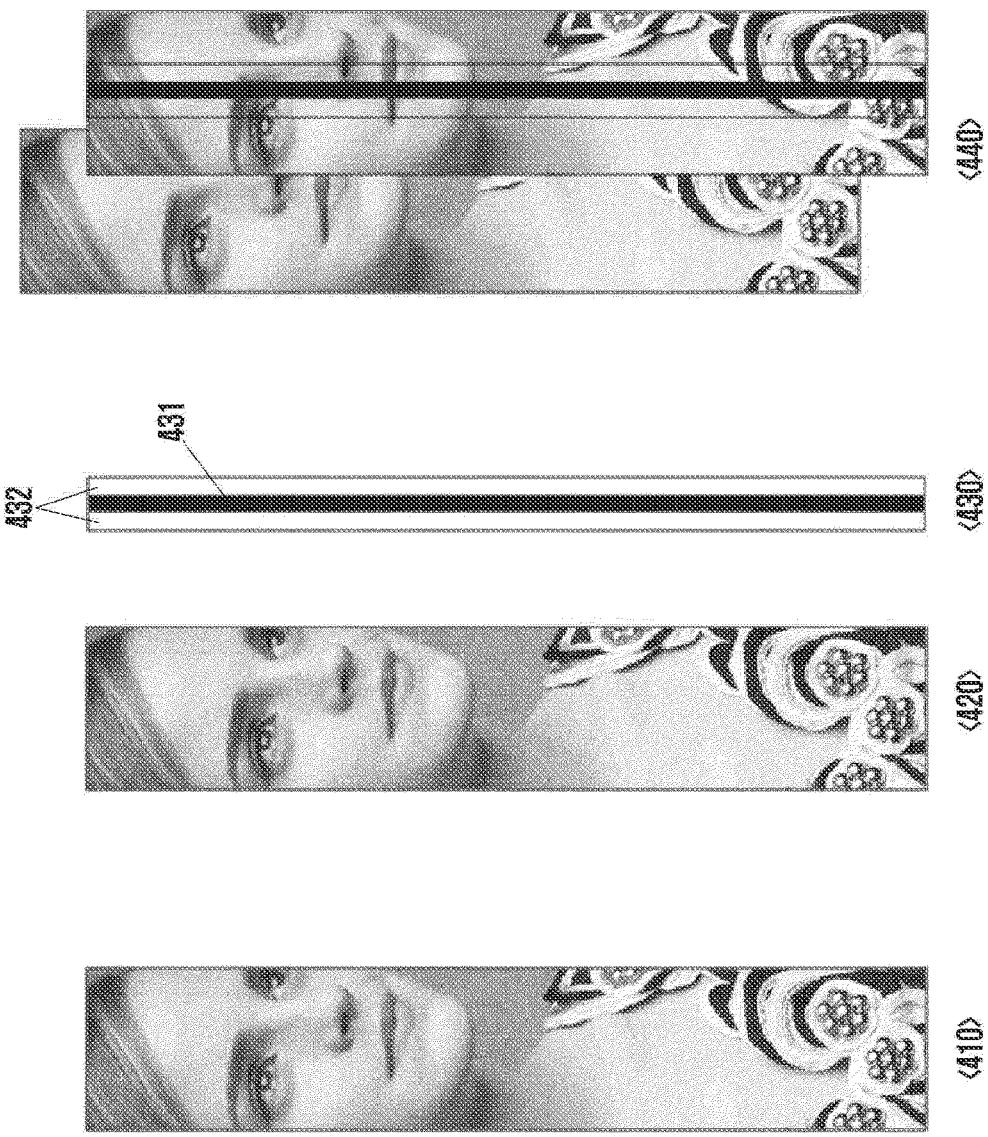
FIG. 4 is a view illustrating a method of controlling a display of a screen of an electronic device according to an embodiment of the present disclosure.

For example, as illustrated in FIG. 4, the controller 150 may copy the selected image 410 and generate the copied image 420.

FIG. 4 is a view illustrating a method of controlling a display of a screen of an electronic device according to an embodiment of the present disclosure.

The controller 150 may select a masking pattern in operation 330. The controller 150 may select a masking pattern according to settings or an input of the user. The masking pattern may include at least one first area and at least one second area. For example, as illustrated in FIG. 4, the controller 150 may select a masking pattern 430 including at least one first area 431 and at least one second area 432. Meanwhile, according to various embodiments of the present disclosure, the controller 150 may perform operation 310 and operation 330 irrespective of the sequence.

The controller 150 may arrange the first and second images in an upper layer and a lower layer, and may arrange the selected masking pattern at at least a portion of the arranged first and second images, in operation 340. For example, the controller 150 may arrange the selected masking pattern in the uppermost layer. FIG. 4 illustrates a layer structure 440 in which the first and second images and the masking pattern according to an embodiment of the present disclosure are arranged.

FIGS. 5A and 5B are views illustrating a process of controlling an inclination of an electronic device according to various embodiments of the present disclosure.

According to an embodiment, the controller 150 may measure an inclination of the electronic device 100 through the sensor unit 120, and may identify whether the measured inclination is different from a reference inclination in operation 350. According to an embodiment, the controller 150 may set the case in which the inclination of the electronic device 100 is 0 as a reference inclination. For example, as illustrated in FIGS. 5A and 5B, the controller 150 may measure an inclination of the electronic device 100 with respect to at least one of the X axis and the Y axis.

When the measured inclination of the electronic device 100 is a reference inclination, the controller 150 may display a part of the first image corresponding to at least one first area of the arranged masking pattern in a screen corresponding to the first area, in operation 360. The controller 150 may display a part of the second image corresponding to at least one second area of the arranged masking pattern, in a screen corresponding to the at least one second area.

Figure 6:
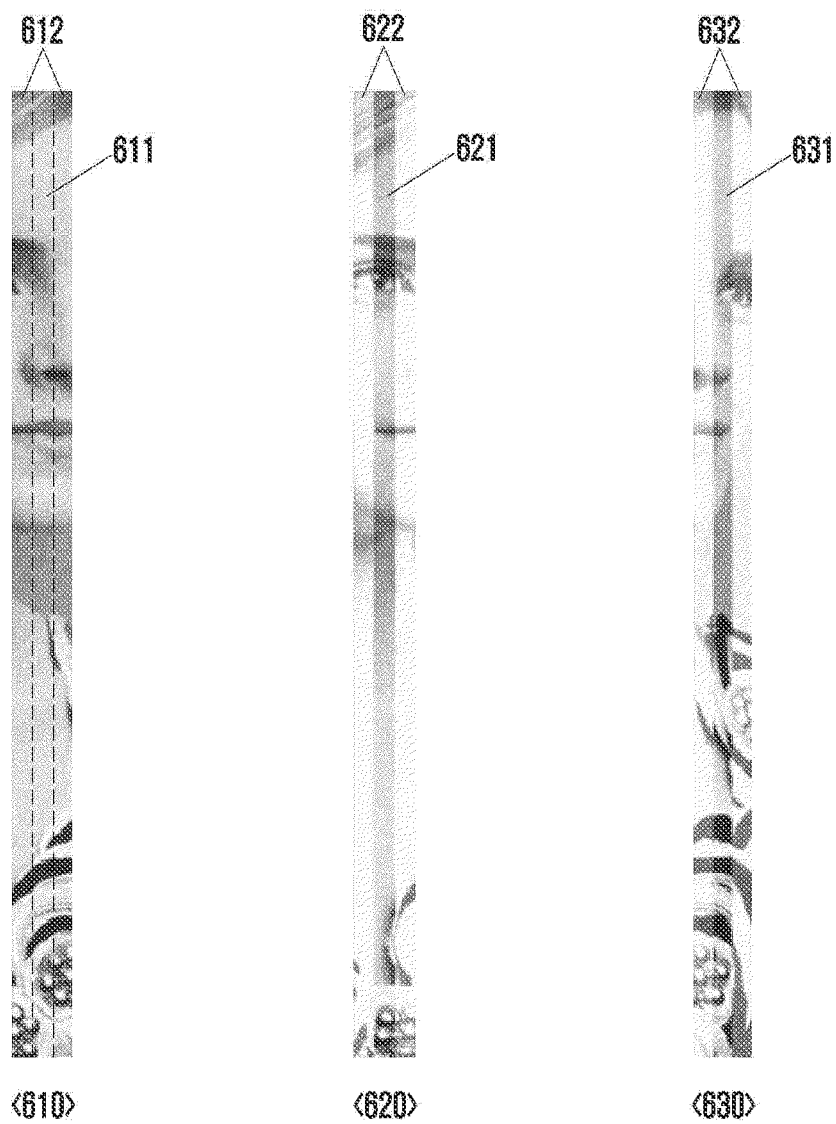
FIG. 6 is a view illustrating a method of controlling a display of a screen of an electronic device based on an inclination of the electronic device according to various embodiments of the present disclosure.

FIG. 6 is a view illustrating a method of controlling a display of a screen of an electronic device based on an inclination of the electronic device according to various embodiments of the present disclosure.

For example, referring to reference numeral 610 of FIG. 6, the controller 150 may display a part of the first image corresponding to the corresponding location in a screen 611 corresponding to the first area, and may display a part of the second image corresponding to the corresponding location in a screen 612 corresponding to the second area. As an example, the controller 150 may adjust the transparency of the first image corresponding to the location of the second area (for example, to a highest value) to display a part of the second image corresponding to the location of the second area. Because the first image and the second image are the same copied image, the image output through the display unit 130 may be the same as the selected image as a result.

Meanwhile, when the measured inclination of the electronic device 100 is not a reference inclination, the controller 150 may move the first image with respect to the arranged masking pattern at a preset first acceleration based on the measured inclination of the electronic device 100, and may move the second image with respect to the arranged mask pattern at a preset second acceleration, in operation 370. For example, the controller 150 may move the first image with respect to the masking pattern at the first acceleration, by a time corresponding to the magnitude of the measured inclination, in a direction corresponding to the direction of the measured inclination. The controller 150 may move the second image with respect to the masking pattern at the second acceleration, by a time corresponding to the magnitude of the measured inclination, in a direction corresponding to the direction of the measured inclination. When the magnitude of the first acceleration and the magnitude of the second acceleration are different, the movement distances of the first and second images for the arranged masking pattern may be different.

The controller 150 may display a part of the moved image corresponding to at least one first area of the arranged masking pattern, in a screen corresponding to the at least one first area, in operation 380. The controller 150 may display a part of the moved second image corresponding to at least one second area of the arranged masking pattern, in a screen corresponding to the at least one second area. Referring to reference numerals 620 and 630 of FIG. 6, when the electronic device 100 is inclined at a predetermined inclination in the leftward direction 620 or the rightward direction 630, the controller 150 may move the first image with respect to the masking pattern at a first acceleration based on the inclination and may display the moved part of the first image corresponding to the corresponding location in screens 621 and 631 corresponding to the first area. The controller 150 may move the second image with respect to the masking pattern at a second acceleration based on the inclination, and may display the moved part of the second image corresponding to the corresponding location in screens 622 and 632 corresponding to the second area. As an example, the controller 150 may adjust the transparency of a part of the moved first image corresponding to the location of the second area (for example, to a highest value) to display a part of the moved second image corresponding to the location of the second area. Because the first image and the second image are the same copied image, the image output through the display unit 130 may be displayed as if the selected image deviates from the border of the first and second areas of the masking pattern when the first acceleration and the second acceleration are set to be different. In this way, the controller 150 may provide an emotional and visual effect for the selected image according to the inclination of the electronic device 100.

Furthermore, the controller 150 may adjust at least one display attribute of the part of the first image and the part of the second image displayed through a screen, based on the measured inclination of the electronic device 100, operation 390. For example, a display attribute of an image may include at least one value of a brightness value, a contrast value, and a size value of the image. Referring to reference numerals 620 and 630 of FIG. 6, the controller 150 may adjust the brightness value of the part of the second image to be larger than the brightness value of the first image according to the measured inclination of the electronic device 100. For example, the controller 150 may increase the brightness value of the second image according to the measured inclination of the electronic device 100. Accordingly, as a result, the image output through the display unit 130 may be clearly distinguished between the first and second areas.

Figure 7A:
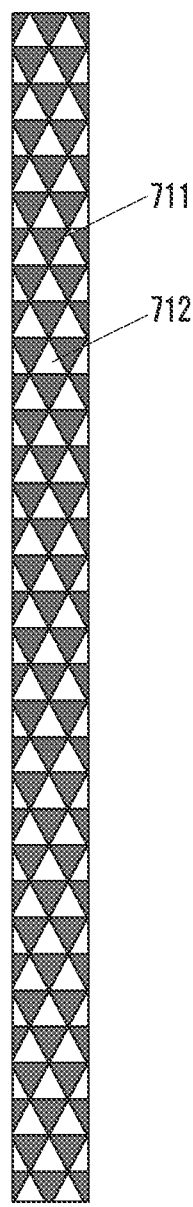
FIGS. 7A, 7B, and 7C are views illustrating a masking pattern according to various embodiments of the present disclosure.
Figure 7B:
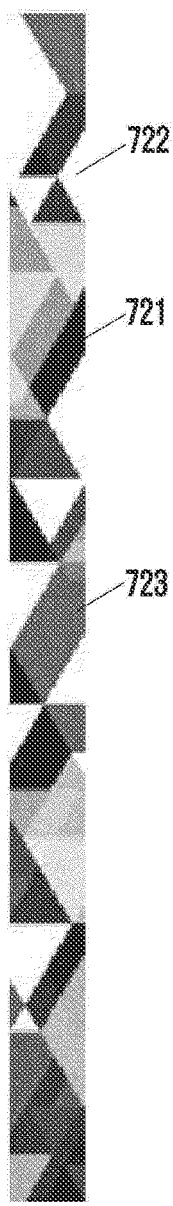
Figure 7C:
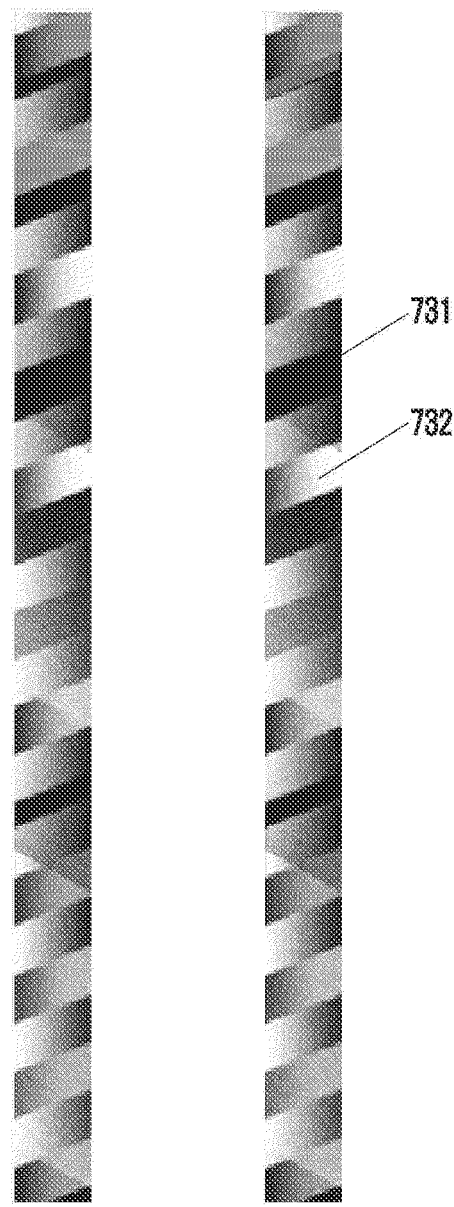
Figure 8A:
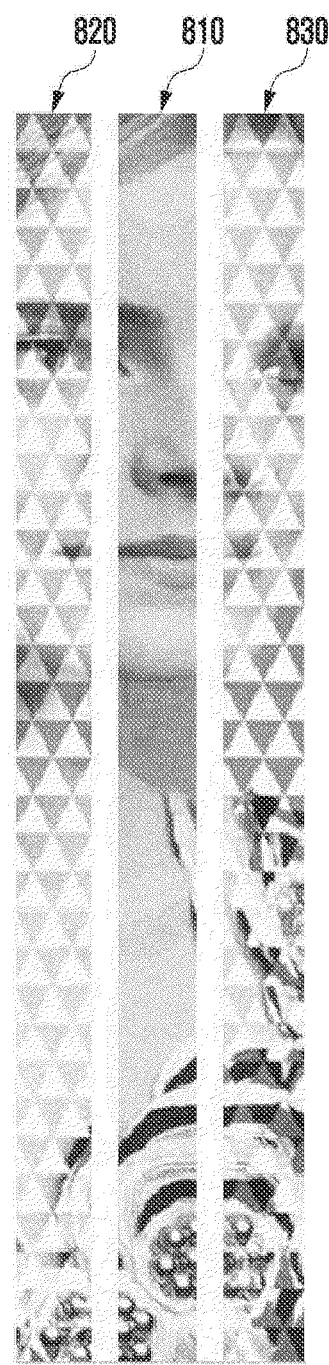
FIGS. 8A, 8B, and 8C are views illustrating a method of controlling a display of a screen of an electronic device based on an inclination of the electronic device according to various embodiments of the present invention disclosure.
Figure 8B:
Figure 8C:

FIGS. 7A to 7C are views illustrating a masking pattern according to various embodiments of the present disclosure. FIGS. 8A to 8C are screen views illustrating a method of controlling a display of a screen of the electronic device 100 to which the masking pattern of FIGS. 7A to 7C is applied according to various embodiments of the present disclosure.

Referring to FIG. 7A, the selected masking pattern may include, for example, a repeated pattern. A triangle pattern illustrated in the drawings is an example, and various embodiments of the present disclosure may include patterns of various shapes. The selected masking pattern may be classified into a first area 711 and a second area 712. For example, the first area 711 may be an area for displaying a corresponding part of the first image arranged in the upper layer. The second area 712 may be an area for displaying a corresponding part of the second image arranged in the upper layer.

FIG. 8A illustrates a screen 810 in the case in which the inclination of the electronic device 100 is a reference inclination, a screen 820 in the case in which the electronic device 100 is inclined leftwards by a predetermined inclination with respect to the reference inclination, and a screen 830 in which the electronic device 100 is inclined rightwards by a predetermined inclination with respect to the reference inclination, in the electronic device 100 to which the masking pattern of FIG. 7A is applied.

Referring to FIG. 7B, the selected masking pattern may include, for example, an irregular pattern. The selected masking pattern may be classified into a first area 721, a second area 722, and a third area 723. For example, the first area 721 may be an area for displaying a corresponding part of the first image arranged in the upper layer. The second area 722 may be an area for displaying a corresponding part of the second image arranged in the upper layer. The third area 723 may be an area for displaying an overlapped part of the part of the first image and the part of the second image corresponding to the corresponding location. For example, an overlapped part of the part of the first image and the part of the second image in a screen corresponding to the third area 723 may be displayed by adjusting the transparency of the part of the first image corresponding to a location of the third area 723 according to settings. The black-colored area of the illustrated masking pattern may be at least one first area 721, the white-colored area may be at least one second area 722, and the grey-colored area having various brightness values may be at least one third area 723. For example, the transparency of the first image corresponding to the location of the corresponding area may be adjusted according to the brightness of the third area 723.

FIG. 8B illustrates a screen 840 in the case in which the inclination of the electronic device 100 is a reference inclination, a screen 850 in the case in which the electronic device 100 is inclined leftwards by a predetermined inclination with respect to the reference inclination, and a screen 860 in which the electronic device 100 is inclined rightwards by a predetermined inclination with respect to the reference inclination, in the electronic device 100 to which the masking pattern of FIG. 7B is applied.

Referring to FIG. 7C, the selected masking pattern may include a first area 731 and a second area 732. For example, the first area 731 may be an area for displaying a corresponding part of the first image arranged in the upper layer. The second area 732 may be an area for displaying an overlapped part of the part of the first image and the part of the second image corresponding to the corresponding location. For example, an overlapped part of the part of the first image and the part of the second image in a screen corresponding to the second area 732 may be displayed by adjusting the transparency of the part of the first image corresponding to a location of the second area 732 according to settings. The black-colored area of the areas of the illustrated masking pattern may be at least one first area 731, and the area including various gradations may be at least one second area 732. For example, the second area 732 may gradually adjust the transparency of the corresponding part of the first image according to the gradation of the corresponding area.

FIG. 8C illustrates a screen 870 in the case in which the inclination of the electronic device 100 is a reference inclination, a screen 880 in the case in which the electronic device 100 is inclined leftwards by a predetermined inclination with respect to the reference inclination, and a screen 890 in which the electronic device 100 is inclined rightwards by a predetermined inclination with respect to the reference inclination, in the electronic device 100 to which the masking pattern of FIG. 7B is applied.

According to various embodiments of the present disclosure, at least some of the devices (for example, an electronic device (120) or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the storage or the memory 260. At least some of the programming modules may be implemented (for example, executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a ROM, a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a display of a screen of an electronic device, the method comprising:
    selecting a first image and a second image, the first image and second image being copies of a same image;
    selecting a masking pattern comprising at least one first area and at least one second area;
    measuring an inclination of the electronic device;
    determining a part of the first image displayed in a screen corresponding to the at least one first area and a part of the second image displayed in a screen corresponding to the at least one second area, based on the masking pattern and the measured inclination of the electronic device; and
    outputting the determined parts of the first image and the second image on the display.

2. The method of claim 1, wherein the selecting of the first image and the second image comprises:
    selecting an arbitrary image;
    copying the selected image; and
    generating the selected arbitrary image and the copied image as the first and second images, or the second and first images, respectively.

3. The method of claim 1, wherein the outputting of the determined parts of the first image and the second image comprises:
    arranging the first image and the second image in an upper layer and a lower layer, respectively; and
    arranging the masking pattern on at least a part of the arranged first and second images.

4. The method of claim 3, wherein the outputting of the determined parts of the first image and the second image comprises:
    moving the first image with respect to the arranged masking pattern at a first acceleration, based on the measured inclination of the electronic device; and
    displaying a part of the moved first image corresponding to the at least one first area in a screen corresponding to the at least one first area.

5. The method of claim 4, wherein the outputting of the determined parts of the first image and the second image comprises:
    moving the second image with respect to the arranged masking pattern at a second acceleration set to be different from the first acceleration, based on the measured inclination of the electronic device; and
    displaying a part of the moved second image corresponding to the at least one second area in a screen corresponding to the at least one second area.

6. The method of claim 5, wherein the displaying of the part of the moved second image in the screen comprises:
    adjusting a transparency of a part of the moved first image corresponding to the at least one second area, based on the measured inclination of the electronic device.

7. The method of claim 5,
    wherein the masking pattern further comprises at least one third area, and
    wherein the method further comprises displaying a part of the moved second image corresponding to the at least one third area in a screen corresponding to the at least one third area.

8. The method of claim 7, wherein the displaying of the part of the moved second image in the screen comprises at least one of:
    adjusting a transparency of the part of the moved first image corresponding to the at least one third area, based on the measured inclination of the electronic device;
    adjusting a transparency of the moved first image corresponding to the at least one third area such that the transparency of the moved first image corresponds to a value set in the at least one third area, based on the measured inclination of the electronic device; or
    adjusting the transparency of the part of the moved first image corresponding to the at least one third area in a preset gradation form, based on the measured inclination of the electronic device.

9. The method of claim 1, wherein the outputting of the determined parts of the first image and the second image comprises:
    adjusting at least one display attribute of the part of the first image and the part of the second image, based on the measured inclination of the electronic device; and
    outputting the adjusted display attribute.

10. The method of claim 9,
    wherein the display attribute comprises at least one of the brightness, contrast, or size of the image, and
    wherein the outputting of the display attribute comprises:
        adjusting at least one of the brightness, contrast, or sizes of the part of the first image and the part of the second image differently, and
        outputting the adjusted part of the first image and the part of the second image.

11. The method of claim 1, further comprising outputting a classified display of the masking pattern at a predetermined time interval in a screen output through the display.

12. An electronic device comprising:
    a display configured to display a screen;
    a sensor configured to measure an inclination of the electronic device; and at least one processor configured to:
- select a first image and a second image,
- select a masking pattern comprising at least one first area and at least one second area,
- determine a part of the first image displayed in a screen corresponding to the at least one first area and a part of the second image displayed in a screen corresponding to the at least one second area, based on the masking pattern and the measured inclination of the electronic device, and
- output the determined parts of the first image and the second image on the display.

13. The electronic device of claim 12, wherein the at least one processor is further configured to:
- select an arbitrary image,
- copy the selected image, and
- generate the selected image and the copied image as the first and second images, or the second and first images, respectively.

14. The electronic device of claim 12, wherein the at least one processor is further configured to:
- arrange the first image and the second image in an upper layer and a lower layer, respectively, and
- arrange the masking pattern on at least a part of the arranged first and second images.

15. The electronic device of claim 14, wherein the at least one processor is further configured to:
- move the first image with respect to the arranged masking pattern at a first acceleration, based on the measured inclination of the electronic device, and
- display a part of the moved first image corresponding to the at least one first area in a screen corresponding to the at least one first area.

16. The electronic device of claim 15, wherein the at least one processor is further configured to:
- move the second image with respect to the arranged masking pattern at a second acceleration set to be different from the first acceleration, based on the measured inclination of the electronic device, and
- display a part of the moved second image corresponding to the at least one second area in a screen corresponding to the at least one second area.

17. The electronic device of claim 16, wherein the at least one processor is further configured to adjust a transparency of the part of the moved first image corresponding to the at least one second area, based on the measured inclination of the electronic device.

18. The electronic device of claim 16,
- wherein the masking pattern further comprises at least one third area, and
- wherein the at least one processor is further configured to display a part of the moved second image corresponding to the at least one third area in a screen corresponding to the at least one third area.

19. The electronic device of claim 18, wherein the at least one processor is further configured to perform at least one operation of:
- adjusting a transparency of the part of the moved first image corresponding to the at least one third area, based on the measured inclination of the electronic device;
- adjusting a transparency of the part of the moved first image corresponding to the at least one third area such that the transparency of the moved first image corresponds to a value set in the at least one third area, based on the measured inclination of the electronic device; or
- adjusting the transparency of the part of the moved first image corresponding to the at least one third area in a preset gradation form, based on the measured inclination of the electronic device.

20. The electronic device of claim 12, wherein the at least one processor is further configured to:
- adjust at least one display attribute of the part of the first image and the part of the second image, based on the measured inclination of the electronic device, and
- output the adjusted display attribute.

21. The electronic device of claim 20,
- wherein the display attribute comprises at least one of the brightness, contrast, or size of the image, and
- wherein the at least one processor is further configured to:
  - adjust at least one of the brightness, contrast, or sizes of the part of the first image and the part of the second image differently, and
  - output the adjusted part of the first image and the part of the second image.

22. The electronic device of claim 12, wherein the at least one processor is further configured to output a display of the masking pattern at a predetermined time interval in a screen output through the display.

* * * * *